United States Patent [19]
Stoll

[11] Patent Number: 4,519,421
[45] Date of Patent: May 28, 1985

[54] SOLENOID VALVE

[76] Inventor: Kurt Stoll, Lenzhalde 72, 7300 Esslingen, Fed. Rep. of Germany

[21] Appl. No.: 508,961

[22] Filed: Jun. 28, 1983

[30] Foreign Application Priority Data

Jul. 3, 1982 [DE] Fed. Rep. of Germany ....... 3224937

[51] Int. Cl.³ .............................................. F16K 11/10

[52] U.S. Cl. .......................... 137/596.16; 137/596.18; 137/884; 91/442

[58] Field of Search ....................... 137/596.14, 596.16, 137/596.18, 884, 885, 625.64; 91/442, 446, 536, 533, 534

[56] References Cited

U.S. PATENT DOCUMENTS

| | | | |
|---|---|---|---|
| 1,769,081 | 7/1930 | Stevens | 91/442 |
| 2,716,997 | 9/1955 | Crookston | 137/102 |
| 3,522,821 | 8/1970 | Komendera | 137/625.64 |
| 3,895,648 | 7/1975 | Stoll et al. | 137/550 |
| 4,068,902 | 1/1978 | Deem et al. | 137/627.5 |
| 4,187,764 | 2/1980 | Cho | 91/442 |
| 4,245,673 | 1/1981 | Bouteille et al. | 137/884 |
| 4,253,692 | 3/1981 | Garlinghouse | 91/442 |
| 4,450,864 | 5/1984 | Huckebrink | 137/596.16 |

FOREIGN PATENT DOCUMENTS

| | | | |
|---|---|---|---|
| 920334 | 10/1954 | Fed. Rep. of Germany | 137/596.18 |
| 2334413 | 1/1975 | Fed. Rep. of Germany . | |

*Primary Examiner*—Henry C. Yuen
*Assistant Examiner*—John Kwon
*Attorney, Agent, or Firm*—Flynn, Thiel, Boutell & Tanis

[57] ABSTRACT

A solenoid valve has an air outlet or relief plate fixed thereon. The valve in keeping with the invention is so designed that only high pressure air flows are switched or controlled, one such flow being used for the pilot control of a large-size air outlet valve housed in the plate. A number of such valve units may be placed in a line on a mounting plate that has a common air feed duct with its branches for the different valve units.

10 Claims, 5 Drawing Figures

SOLENOID VALVE

FIELD OF THE INVENTION

The present invention relates to solenoid valves.

BACKGROUND OF THE INVENTION

The present invention relates to solenoid valves and more specially to a 4/2 (4-way, 2-position) solenoid valve having a valve operation solenoid designed for moving a valve closing member and a housing with a compressed air inlet port, an air outlet or exhaust port and two ports for power air from the valve to a load. A number of different forms of such valves are used in the pneumatic art. If they are used for controlling the supply of compressed air and for letting off spent, expanded air coming from a load, the valve housing has generally had to be made relatively large in size, because large flow cross sections are needed for the expanded air.

SUMMARY OF THE PRESENT INVENTION

One purpose of the invention is making a design of a solenoid valve of the sort noted that while being compact in size makes possible large duct cross sections for letting off the air from the load controlled by the valve.

For effecting these and other purposes, a 4/2 solenoid valve according to the present invention has an air outlet plate fixed on the housing of the valve and a first power air duct joined with a power air port in the housing, an air inlet or feed duct joined with an inlet port of the housing, and furthermore a second power air duct which is joined with an air outlet port whose axis is parallel to the major plane of the air outlet plate, the port opening towards the edge of this plate, and a valve seat with a large diameter is provided in the air outlet duct and a valve body that may be moved in the duct is provided for opening and shutting off the seat, the valve body's end face facing away from the seat and being joined by way of a pilot duct in the plate with the second power air port of the housing.

In solenoid valve in keeping with the invention, generally speaking, the control functions take place only on the high pressure air flows. Of these flows, one is used for supplying a load whereas the other is used for controlling the air outlet valve in the air outlet plate fixed on the valve housing. Because of this the housing of the solenoid valve may be made very small in size. Furthermore the air outlet plate will be very compact seeing that the air outlet duct, running in the plane of the plate, may be made with a very large cross section to let off the air, while the plate itself is thin. It is for this reason that the overall unit made up of the solenoid or magnetic valve as such and the air outlet may be made with a smaller size than a prior air solenoid valve in which the control function takes place by switching the air coming from the load.

Further useful developments of the invention are covered by the dependent claims herein.

In keeping with one such outgrowth of the invention, the plate has a hollow screw that may be screwed into part of a unit supplied by the valve, that is to say, so that there is a direct connection with the load and no further connection piping is needed.

It is furthermore possible for there to be an automatic controller plate on a side of the air outlet plate that is nearest to the load, the controller plate having a pressure controller joined up with the power air duct in the air outlet plate, the controller plate furthermore having a through duct in it joined with the second duct for power air.

In the solenoid valve it is furthermore possible for the supply pressure for the load to be adjusted, this further function being possible without the overall size of the valve having to be markedly larger. Such solenoid valves with an automatic control function and normal solenoids may be made up of the same groups of parts.

The invention also relates to an assembly made up of a bank of such valves placed in line with each other on a support or mounting plate having a supply duct running all the way therethrough and joined up by way of branch ducts with the supply ducts of the different air outlet plates and having pairs of connection unions, each of which is joined up with one of the two air power ducts of the air outlet plate.

This further development of the invention with a bank of valves is useful because it gives a straightforward system of solenoid valves, whose condition may be quite clearly seen, without connection hoses.

Further useful effects and details of the invention will be seen from the account now to be given of certain working examples of the invention using the figures.

DETAILED DESCRIPTION

Figure 1:
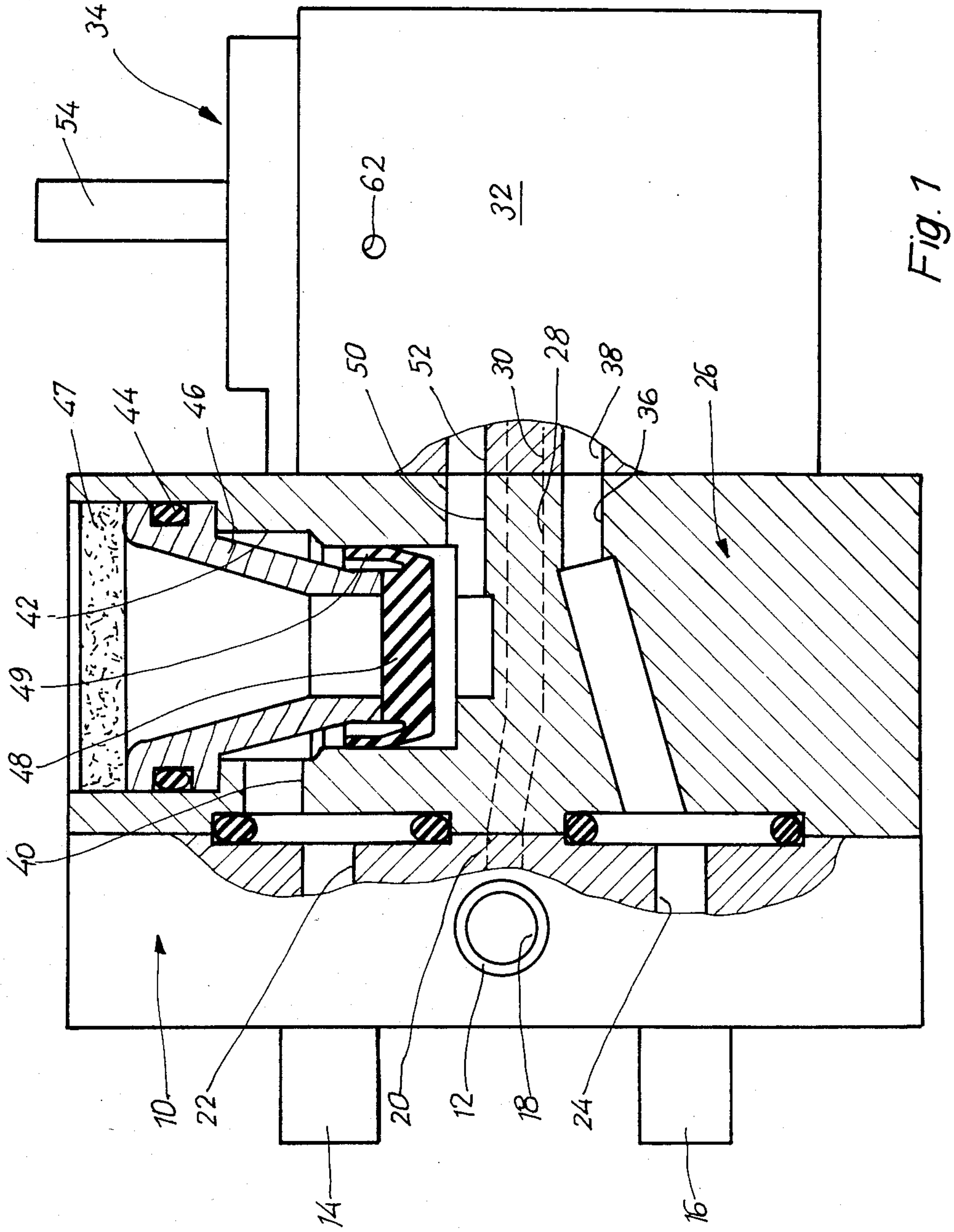
FIG. 1 is a side view of a bank of valves with some parts broken away.

Turning first to FIG. 1 it will be seen that a support or base plate 10 has a feed union 12 on its end face for connection up with a compressed air supply. On the side face to be seen on the left in FIG. 1, pairs of connection unions 14 and 16 are placed so as to be in line with each other and may be joined up with different loads.

The supply union or connector 12 is joined up with a supply duct 18 running in a direction normal to the plane of the drawing, there being a number of branch ducts 20 running off from the duct 18. The ducts 20 are placed one to the back of the other in line and come to an end in the side face that is to be seen on the right in FIG. 1 of the base plate.

The connection unions 14 and 16 are in each case joined up with power air ducts 22 and 24, the same as well running to ports on the right hand side of the base plate 10.

On the side face, to be seen on the right in FIG. 1, of the base plate 10, an air outlet plate 26 is placed that is fixed in position by way of fasteners such as screws, not to be seen in the figure. The plate 26 has a supply duct 28 running all the way therethrough and forming a further part of the through branch duct 20 going as far as a supply or feed duct 30 formed in the housing 32 of a solenoid valve generally numbered 34.

The solenoid valve 34 is a conventional 4-way, 2-position pneumatic valve, and is therefore not illustrated in detail. It includes the feed duct 30 which receives compressed air from an external source, two working ducts 38 and 52 which can be connected to opposite ends of a fluid actuated cylinder or to some other appropriate load, and an exhaust port 62. The valve 32 operates in a conventional manner. In particular, in a first position of the valve, the working ducts 38 and 52 respectively communicate with the feed duct 30 and the exhaust port 62, and in a second position, the working ducts 38 and 52 are respectively connected to the exhaust port 62 and the feed duct 30.

A through duct 36 is responsible for forming a connection between a high pressure power air duct 24 in the base plate 10 and a high pressure power air duct or working duct 38 of the solenoid valve 34. The duct 36 is in line with the duct 24.

The power air duct 22 in the base plate 10 is joined up with an air outlet or lead duct 40 in the air outlet plate 26, the duct 40 for its part opening into an air outlet duct 42, whose diameter is only a little smaller than the thickness of the air outlet plate 26.

The air outlet duct 42 is counterbored, and has at its end with the larger diameter a coned valve seat 46 that is sealed off by an O-ring 44. The wider end of the seat 46 is nearer the outer surface on top of the plate than the rest of the seat. The outer end of the valve seat 46 is covered over by a plate-like muffler 47 which permits 47 the inside of the valve seat 46 to communicate with the atmosphere.

In the smaller diameter part of the air outlet duct 42 there is a valve body 48 made of an elastomeric material, the body 48 having a flexible skirt 49 running on the inner face of the air outlet duct 42. The part of the air outlet duct 42 that is below the body 48 in FIG. 1 is joined by way of a pilot duct 50 with a second power air duct or working duct 52 of the solenoid valve 34.

Contact pins 54, placed one to the back of the other, are used for forming a connection with an electrical control circuit of which no details are given in the figure.

The reader will see that the expanded air coming from the load is able to make its way back into the atmosphere by way of a duct of large cross section, if the valve body 48 is not moved up by compressed air coming from the solenoid valve 34.

In a direction normal to the plane of FIG. 1 there are a number of valve units that are each case in line with respective unions 14 and 16. Each such union has its own air outlet plate and a solenoid valve.

Figure 2:
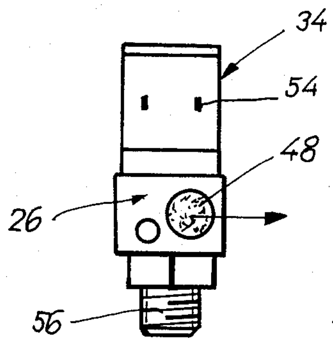
FIG. 2 is a top view of a different form of the solenoid valve of FIG. 1.
Figure 3:
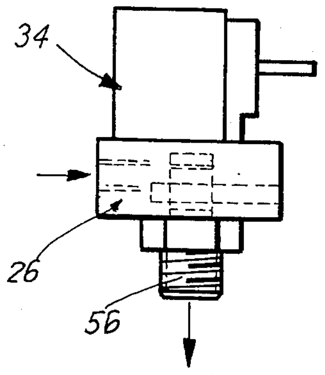
FIG. 3 is a side view of the magnet or solenoid valve of FIG. 2.

In FIGS. 2 and 3 valve units will be seen as well that in each case are made up of an air outlet plate 26 and a solenoid valve 34. The air outlet plate 26 however has a hollow screw 56 so that it may by joined up directly with a load that is to be controlled by the valve, such load being for example a single acting pneumatic actuator.

Figure 4:
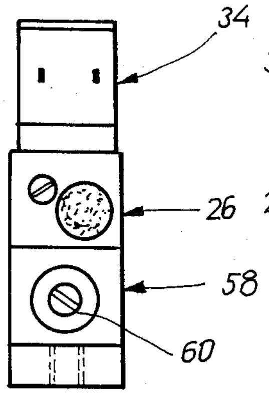
FIG. 4 is a top view of a still further possible form of solenoid valve with an automatic controller fixed thereto.
Figure 5:
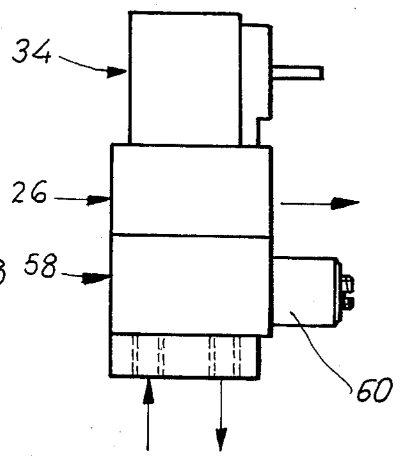
FIG. 5 is a side view of the solenoid valve of FIG. 4.

In FIGS. 4 and 5 a valve unit will be seen that as well has a solenoid valve 34 and an air outlet plate 26 joined therewith. On the air outlet plate there is in addition an automatic control plate 58 having an adjustable pressure controlling valve 60 therein. The valve unit formed by these parts has at lower its face duct openings lined up with the ducts in the air outlet plate 26 so that the valve unit may be fixed to a mounting or base plate 10 as in FIG. 1 in quite the same way as is the case with valve unit to be seen therein.

The embodiments of the invention in which an exclusive property or privilege is claimed are defined as follows:

1. A valve mechanism, comprising: a 4-way, 2-position solenoid valve having a supply duct, two working ducts, and an exhaust port; and an attachment plate secured to said solenoid valve and having a supply duct which communicates with said supply duct in said valve, a pilot duct and a through duct which each communicate with a respective one of said working ducts in said valve, an air outlet duct which extends into said attachment plate from an outer surface thereof and communicates with said pilot duct, and a load duct which communicates with said air outlet duct; and means defining a valve seat in said air outlet duct and a valve member which is located in said air outlet duct between said load duct and said pilot duct and is supported for movement between a closed position sealingly engaging said valve seat and an open position spaced from said valve seat; wherein in said closed position of said valve member said pilot duct communicates with said load duct and said valve member obstructs fluid flow from said pilot and load ducts into said air outlet duct; and wherein in said open position said valve member obstructs fluid flow between said pilot duct and said load and air outlet ducts and said air outlet duct communicates with said load duct.

2. The valve mechanism according to claim 1, wherein said valve seat is a conical member having a wider end which faces said outer surface of said attachment plate.

3. The valve mechanism according to claim 1, including a plate-shaped muffler which extends across an outer end of said air outlet duct.

4. A valve mechanism, comprising: a 4-way, 2-position pneumatic solenoid valve having a supply duct, two working ducts and an exhaust port, said supply and working ducts opening through a surface provided on said valve; an attachment plate releasably secured to said surface of said valve, said plate having a load duct therein, having a discharge duct extending thereinto from an exterior surface thereof, having a supply duct therein which is in fluid communication with said supply duct in said valve, and having a through duct and a pilot duct therein which are each in fluid communication with a respective one of said working ducts in said valve, said load duct and said discharge duct each having a cross-sectional area which is substantially greater than the cross-sectional area of said exhaust port in said valve; and valve means provided in said plate and responsive to fluid pressure in said load and pilot ducts for providing fluid communication between said load and pilot ducts and preventing fluid flow from said load and pilot ducts into said discharge duct in a first condition, and for providing fluid communication between said load and discharge ducts in a second condition.

5. The valve mechanism according to claim 4, wherein said pilot duct opens into said discharge duct at an axially inner end of said discharge duct, wherein said load duct opens into said discharge duct at a location spaced axially from said axially inner end thereof, wherein said valve means includes an annular, sleeve-like valve seat member disposed in said discharge duct and having a portion at one end thereof which sealingly engages an inner surface of said discharge duct, said valve seat member having a further portion which is spaced inwardly from the inner surface of said discharge duct and extends axially past said load duct toward said axially inner end of said discharge duct and has thereon on annular valve seat which faces said axially inner end of said discharge duct; and wherein said valve means includes a valve member which is axially movably supported in said discharge duct between said annular valve seat and said axially inner end of said discharge duct, said valve member sealingly slidably engaging the inner surface of said discharge duct and being movable between a position sealingly engaging said annular valve seat and obstructing fluid flow through said valve seat member and a position sealingly engaging said axially inner end of said discharge duct and obstructing fluid flow through said pilot duct.

6. The valve mechanism according to clam 5, wherein said valve member includes a valve body having an annular, flexible skirt therearound, said skirt extending axially away from said axially inner end of said discharge duct and slidably, sealingly engaging the inner surface of said discharge duct.

7. The valve mechanism according to claim 6, wherein said valve seat member is frustoconical and diverges in a direction away from said axially inner end of said discharge duct, and including an annular seal which encircles said first end of said valve seat member and sealingly engages said valve seat member and the inner surface of said discharge duct.

8. The valve mechanism according to claim 6, including a platelike muffler which is provided in and extends across said discharge duct on a side of said valve seat member remote from said axially inner end of said discharge duct.

9. The valve mechanism according to claim 4, including a base plate which is releasably secured to said attachment plate on a side thereof remote from said solenoid valve, said base plate including a first power air duct which is in fluid communication with said load duct in said attachment plate, a second power air duct which is in fluid communication with said through duct in said attachment plate, and a supply duct and a branch duct, said branch duct being in fluid communication with said supply duct in said base plate and with said supply duct in said attachment plate.

10. The valve mechanism according to claim 9, wherein said base plate has first and second connection unions thereon which are respectively in fluid communication with said first and second power air ducts, and has a feed union thereon which is in fluid communication with said supply duct therein.

* * * * *